(12) United States Patent
Xie et al.

(10) Patent No.: US 10,380,777 B2
(45) Date of Patent: Aug. 13, 2019

(54) METHOD OF TEXTURE SYNTHESIS AND IMAGE PROCESSING APPARATUS USING THE SAME

(71) Applicant: Novatek Microelectronics Corp., Hsinchu (TW)

(72) Inventors: Xiao-Na Xie, ShaanXi Province (CN); Kai Kang, ShaanXi Province (CN); Jian-Hua Liang, ShaanXi Province (CN); Yuan-Jia Du, Shandong Province (CN)

(73) Assignee: Novatek Microelectronics Corp., Hsinchu (TW)

( * ) Notice: Subject to any disclaimer, the term of this patent is extended or adjusted under 35 U.S.C. 154(b) by 337 days.

(21) Appl. No.: 15/347,796

(22) Filed: Nov. 10, 2016

(65) Prior Publication Data

US 2018/0096488 A1    Apr. 5, 2018

(30) Foreign Application Priority Data

Sep. 30, 2016   (CN) .......................... 2016 1 0870931

(51) Int. Cl.
*G06T 7/30*        (2017.01)
*G06T 11/60*       (2006.01)
*G06T 15/04*       (2011.01)
*G06T 11/00*       (2006.01)

(52) U.S. Cl.
CPC ................ *G06T 11/60* (2013.01); *G06T 7/30* (2017.01); *G06T 11/001* (2013.01); *G06T 15/04* (2013.01); *G06T 2210/36* (2013.01)

(58) Field of Classification Search
CPC . G06T 11/60; G06T 15/04; G06T 7/30; G06T 2210/36
See application file for complete search history.

(56) References Cited

U.S. PATENT DOCUMENTS

| | | | | |
|---|---|---|---|---|
| 2009/0080803 | A1* | 3/2009 | Hara | G06T 15/04 382/285 |
| 2009/0226110 | A1* | 9/2009 | Chen | H04N 7/0132 382/263 |
| 2010/0171759 | A1* | 7/2010 | Nickolov | G06T 3/40 345/634 |
| 2013/0286221 | A1* | 10/2013 | Shechtman | G06T 5/00 348/187 |

(Continued)

*Primary Examiner* — Shaghayegh Azima
(74) *Attorney, Agent, or Firm* — JCIPRNET

(57) ABSTRACT

The disclosure proposes a method of texture synthesis and an apparatus using the same. In one of the exemplary embodiments, the step of generating the first single scale detail image would include not limited to: performing a feature extraction of a first pixel block of an image frame to derive a first pixel feature, applying a first criteria to the first pixel feature to derive a positive result, performing a first detail alignment and a maximum extension of the positive result to derived an adjusted positive mapping result, applying a second criteria, which is opposite to the first criteria, to the first pixel feature to derive a negative result, performing a second detail alignment and a minimum extension of the negative result to derived an adjusted negative mapping result, and blending the adjusted positive mapping result and the adjusted negative mapping result to generate the first single scale detail image.

18 Claims, 9 Drawing Sheets

(56) References Cited

U.S. PATENT DOCUMENTS

2013/0286246 A1* 10/2013 Matsuoka ............... G06T 5/007
           348/229.1
2016/0156855 A1*  6/2016 Boulanger ............... G06T 1/20
           348/164
2016/0344957 A1* 11/2016 Kaehler ............... H04N 5/3532

* cited by examiner

Positive Result

Single-scale noise

Multi-scale noise

1101

1102

1103

METHOD OF TEXTURE SYNTHESIS AND IMAGE PROCESSING APPARATUS USING THE SAME

CROSS-REFERENCE TO RELATED APPLICATION

This application claims the priority benefit of China application serial no. 201610870931.6, filed on Sep. 30, 2016. The entirety of the above-mentioned patent application is hereby incorporated by reference herein and made a part of this specification.

TECHNICAL FIELD

The present disclosure is directed to a method of texture synthesis and an imaging processing apparatus using the same.

BACKGROUND

Texture synthesis, also known as detail synthesis, is an important issue in the field of image or video processing as it has garnered lots of attentions in recent years. Texture synthesis can be commonly seen in areas of image processing such as image imprinting, 3D rendering, and so forth. For video processing, one of the challenges is for an image to maintain sufficient details after the image has undergone scaling up, compression, or other operations. Typically, after an image has been enlarged or compressed, the image would suffer a loss of details and a lowering of frequencies. Therefore, endeavors have been made to ameliorate the loss of details in an image by techniques such as texture synthesis.

However, such endeavors are not without difficult challenges. For example, any method used to increase details of an image should not be applied in plain locations of an image in which not a lot of details were present in the original image. Therefore, one of the challenges is to provide appropriate texture synthesis for a single frame.

Further, a video includes multiple frames of images, and an image is often not stationary but comes with motions. Currently, the technology with regard to providing video texture synthesis for an image that is not static but mostly dynamic is hardly mature as there are actually not a lot of solutions in this area of image processing. Alignment of details with global and local motions from frame to frame is another one of the challenges regardless of whether an image is static or dynamic. Especially for an image that is dynamic, without applying appropriate measures to align synthesized details, the image may generate flickers which may render the video difficult to watch.

SUMMARY OF THE DISCLOSURE

Accordingly, the present disclosure is directed to a method of texture synthesis and an image processing apparatus using the same method.

In one of the exemplary embodiments, the disclosure proposes a method of texture synthesis applicable to an image processing apparatus. The proposed method includes not limited to generating a first single scale detail image of a plurality of single scale detail images, and generating a multi-scale detail image by blending the plurality of single scale detail images. The step of generating the first single scale detail image would include not limited to these following steps: performing a feature extraction of a first pixel block of an image frame to derive a first pixel feature, applying a first criteria to the first pixel feature to derive a positive result, performing a first detail alignment and a maximum extension of the positive result to derived an adjusted positive mapping result, applying a second criteria, which is opposite to the first criteria, to the first pixel feature to derive a negative result, performing a second detail alignment and a minimum extension of the negative result to derived an adjusted negative mapping result, and blending the adjusted positive mapping result and the adjusted negative mapping result to generate the first single scale detail image.

In one of the exemplary embodiment, the disclosure is directed to an image processing apparatus which includes not limited to a storage medium and a processor coupled to the storage medium. The processor is configured at least for steps including: generating a first single scale detail image of a plurality of single scale detail images, and generating a multi-scale detail image by blending the plurality of single scale detail images. The step of generating the first single scale detail image as configured by the processor would include not limited to: performing a feature extraction of a first pixel block of an image frame to derive a first pixel feature, applying a first criteria to the first pixel feature to derive a positive result, performing a first detail alignment and a maximum extension of the positive result to derived an adjusted positive mapping result; applying a second criteria, which is opposite to the first criteria, to the first pixel feature to derive a negative result, performing a second detail alignment and a minimum extension of the negative result to derived an adjusted negative mapping result, and blending the adjusted positive mapping result and the adjusted negative mapping result to generate the first single scale detail image.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
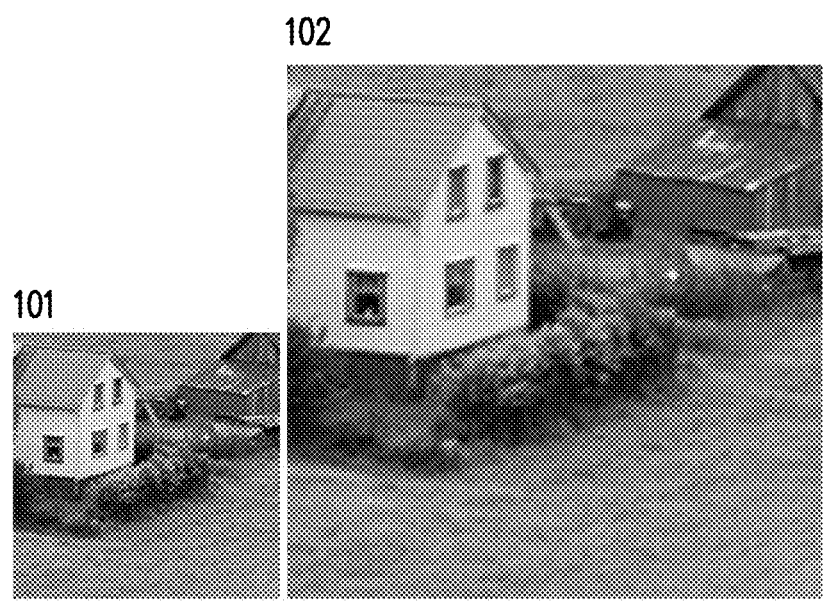
FIG. 1 illustrate degradation detail of still image.

Reference will now be made in detail to the present exemplary embodiments of the disclosure, examples of which are illustrated in the accompanying drawings. Wherever possible, the same reference numbers are used in the drawings and the description to refer to the same or like parts.

The disclosure proposes a method of texture synthesis so as to display an image with an increased level of details of an image after the image has been scaled up. For a video in which images are dynamic rather than static, the alignment of synthesized details corresponding to frames with global and location motion would minimize or eliminate flickering of images. For example, the first image 101 of FIG. 1 is an original image that includes a house and a lawn, and the second image 102 is enlarged version of the first image 101. For the second image 102, the house and the lawn are visible blurry due to the lack of details. Therefore, the proposed method aims to display an enlarged image with an enhanced level of details by synthesizing additional details for the second image 102. Also, the details are properly aligned so as to minimize or eliminate visible flickers between frames of images.

Figure 2A:
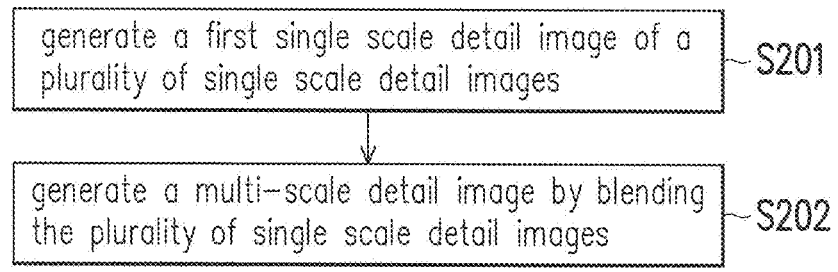
FIG. 2A illustrates a proposed method of texture synthesis in accordance with one of the exemplary embodiments of the disclosure.
Figure 2B:
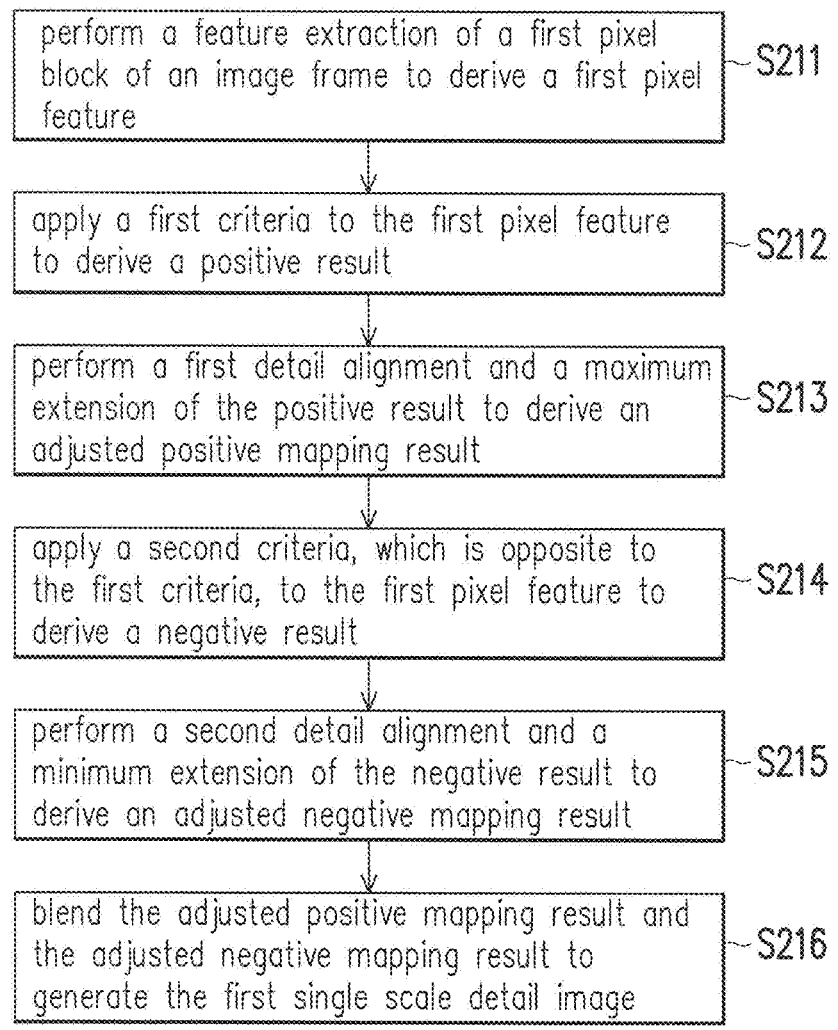
FIG. 2B illustrates the proposed method of texture synthesis with further detail in accordance with one of the exemplary embodiments of the disclosure.

FIG. 2A & FIG. 2B are flow charts that illustrates the proposed method of texture synthesis in accordance with one of the exemplary embodiments of the disclosure. FIG. 2A illustrates the synthesis of a multi-scale image which includes a plurality of single scale images of difference scales. FIG. 2B illustrates the synthesis of a single scale image. Referring to FIG. 2A, in step S201, a first single scale detail image out of a plurality of single scale detail images is generated. In step S202, a multi-scale detail image is generated by blending together the plurality of single scale detail images of different scales.

Referring to FIG. 2B, in step S211, a feature extraction of a first pixel block of an image frame is performed to derive a first pixel feature. In step S212, a first criteria is applied to the first pixel feature to derive a positive result. In step S213, a first detail alignment and a maximum extension of the positive result are performed to derive an adjusted positive mapping result. In step S214, second criteria, which is opposite to the first criteria, is applied to the first pixel feature to derive a negative result. In step S215, a second detail alignment and a minimum extension of the negative result are performed to derive an adjusted negative mapping result. In step S216, the adjusted positive mapping result and the adjusted negative mapping result are blended together to generate the single scale detail image.

According to one of the exemplary embodiments, the first criteria may include applying a threshold to a pixel of the first pixel feature. If the value of the pixel satisfies the threshold, then the pixel is a part of the positive result. For example, positive result may include summing up pixels that satisfy the threshold according to a predetermined weight value.

According to one of the exemplary embodiments, the second criteria could be opposite to the first criteria. For example, by applying a threshold a pixel of the first pixel feature, if the value of the pixel does not satisfy the threshold, then the pixel is a part of the negative result. The negative may then include summing up pixels that does not satisfy the threshold according to a predetermined weight value.

According to one of the exemplary embodiments, the first detail alignment may include applying a look up table to transform the positive result to a positive mapping result. The (local) maximum extension may include increasing the highest number of the positive mapping to result to a higher number. The second detail alignment may include applying the same look up table to transform the negative result to a negative mapping result. The (local) minimum extension may include decreasing the highest number of the positive mapping to result to a lower number. For example, the highest number of the positive mapping result may multiply by (1+gain1), where gain1 is a number selected between 0 and 1. The negative number of the negative mapping may multiply by (1−gain2), where gain2 is a number selected between 0 and 1.

According to one of the exemplary embodiments, the multi-scale detail image could be generated by performing a second single scale texture synthesis of a second pixel block of the first image frame to generate a second single scale detail image of the plurality of single scale images. The second pixel block could be larger than the first pixel block. The multi-scale detail image could be generated by blending at least but not limited to the first single scale detail image and the second single scale detail image. The first single scale detail image may include a group of pixel blocks having a specific length of block radius and a specific quantity of peripheral pixels, and the length and quantity are different from the second single scale detail image.

Figure 3A:
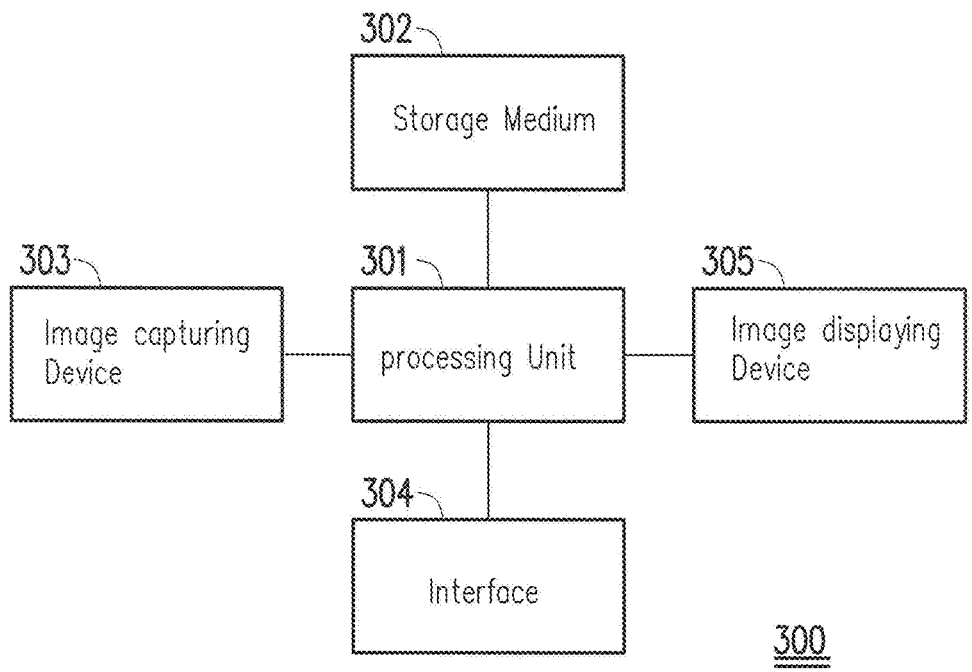
FIG. 3A illustrates the hardware of an image processing apparatus in terms of functional block diagram in accordance with one of the exemplary embodiments of the disclosure.

FIG. 3A illustrates the hardware of an image processing apparatus 300 in terms of functional block diagram in accordance with one of the exemplary embodiments of the disclosure. The exemplary imaging processing apparatus 300 would include not limited to a processing unit 301 and a storage medium 302. The processing unit 301 would be configured to implement functional elements of the proposed method of texture synthesis such as the method steps of FIG. 2A, FIG. 2B, as well as exemplary embodiments in the subsequent disclosures. The functions of the processing unit 301 may be implemented by using one or multiple programmable units such as a micro-processor, a microcontroller, a DSP chips, FPGA, etc. The functions of the processing unit 301 may also be implemented with separate electronic devices or ICs, and functions of the processing unit 301 may also be implemented with hardware or software or the combination of both.

The processing circuit would be electrically coupled to a storage medium 302 to store programming codes, device configurations, look up tables, buffered or permanent data, and etc. The storage medium 305 could be volatile or permanent memories which would store buffered or permanent data such as compiled programming codes used to execute functions of the exemplary image processing apparatus 300. The image processing apparatus 300 of FIG. 3A may optionally include an image capturing device 303, an interface 304, an image displaying device 305, and a communication unit (not shown). The image capturing device 303 could be a camera or a camcorder which captures still or motion images. The interface 304 could be an input/output interface which allows an operator to interact with the image processing apparatus 300 and allows the apparatus to output data. The image displaying device 305 could be any display for displaying transformed images. The communication unit could be a modem or a wireless transceiver used to obtain images from external sources.

Figure 3B:
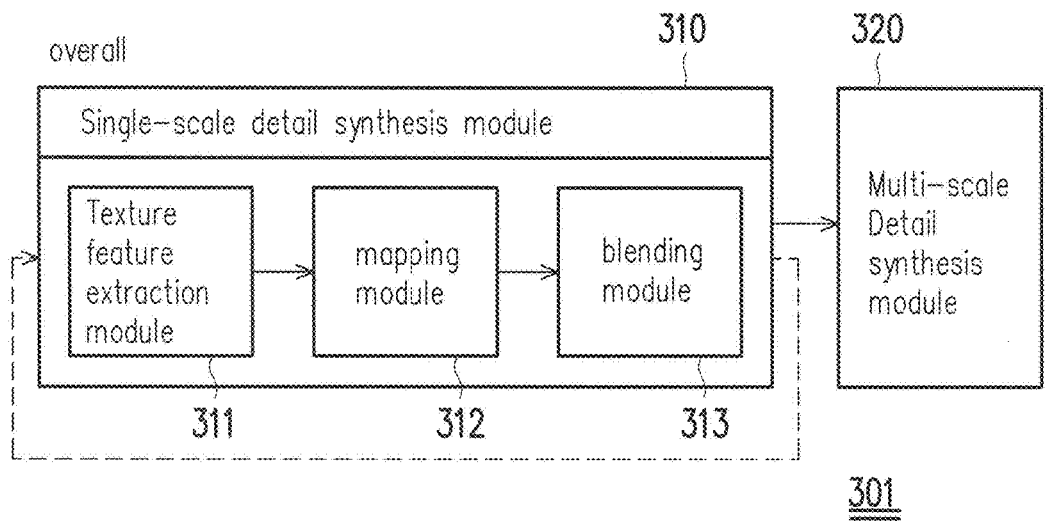
FIG. 3B illustrates the processing unit of the image processing apparatus in further detail in accordance with one of the exemplary embodiments of the disclosure.

FIG. 3B illustrates the processing unit 301 of the image processing apparatus in further detail in accordance with one of the exemplary embodiments of the disclosure. The processing unit 301 may include not limited to a single scale detail synthesis module 310 coupled to a multi-scale detail synthesis module 320. The single scale detail synthesis module 310 may include not limited to a texture feature extraction module 311, a mapping module 312, and a blending module 313. These modules 310, 311, 312, 313, 320 could be implemented as hardware modules such as separate hardware ICs, software modules, or a combination of both hardware and software modules. The texture feature extraction module 311 is configured for performing a local texture feature extraction. The mapping module 312 would receive the output of the texture feature extraction module 311 in order to adjust the output of the local texture feature extraction module 311 to be suitable for synthesizing a texture. The output of the mapping module 312 is received by the blending module 313. The blending module would blend the adjusted positive mapping result and the adjusted negative mapping result so as to synthesize the texture of a particular scale. The details of FIG. 3B is further elucidated in FIG. 4 and subsequent disclosures.

Figure 4:
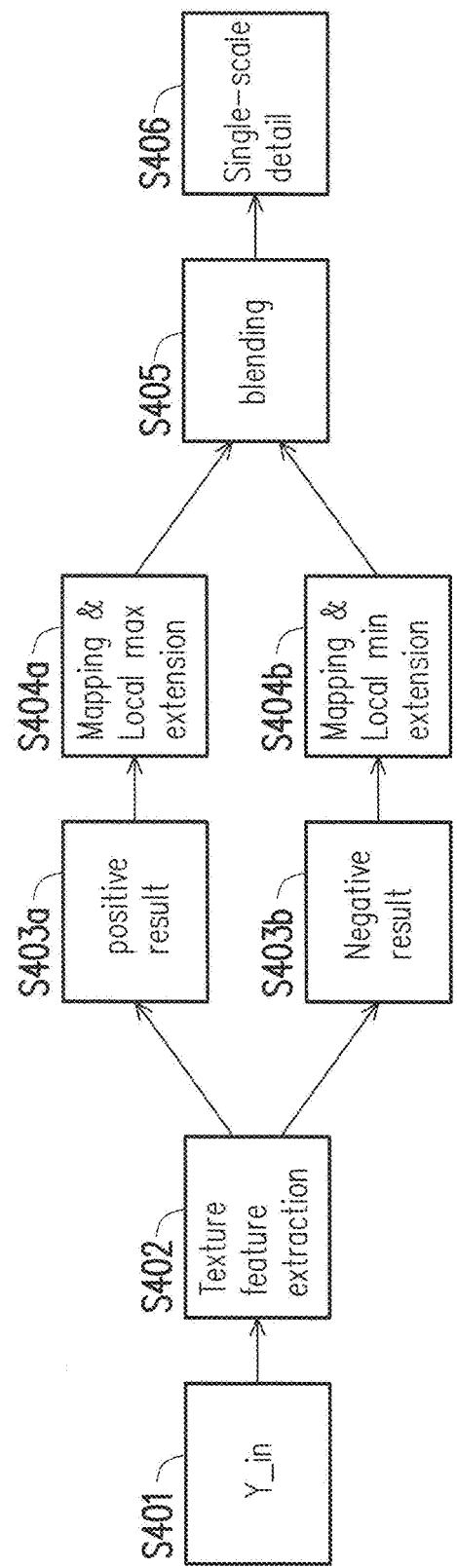
FIG. 4 illustrates single scale detail synthesis in accordance with one of the exemplary embodiments of the disclosure.

FIG. 4 illustrates the procedures of the single scale detail synthesis in accordance with one of the exemplary embodiments of the disclosure. In step S401, the processing unit (e.g. 301) of an image processing apparatus may receive an image which is represented according to the YUV color space and extract the luminance data (Y component) of the image as the input for texture feature extraction. In step S402, the texture feature extraction is to be performed for the input luminance data by a texture feature extraction module (e.g. 311). The texture feature extraction could be performed by a variety of different techniques as the end goals of all techniques are the same or similar. The disclosure provides using local binary pattern (LBP) as an example; however, it should be noted that the disclosure does not limit texture feature extraction to any particular technique.

Figure 5:
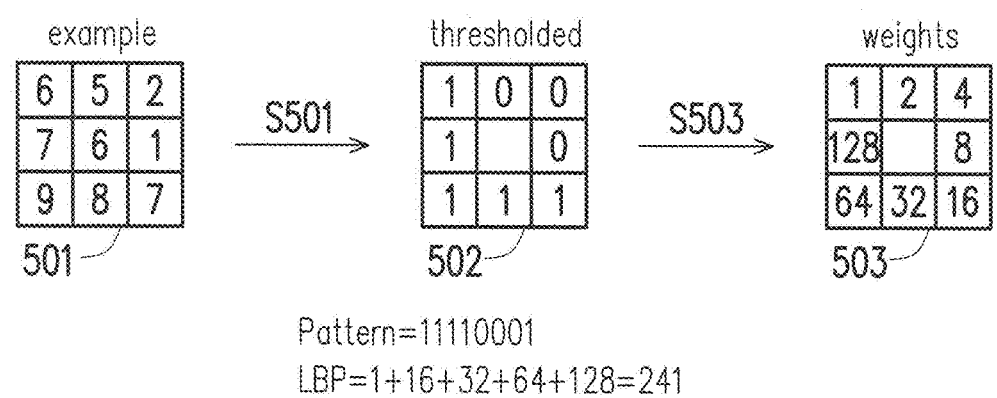
FIG. 5 illustrates an example of texture feature extraction in accordance with one of the exemplary embodiments of the disclosure.

FIG. 5 illustrates an example of texture feature extraction in accordance with one of the exemplary embodiments of the disclosure. It is assumed that an image frame has been divided into cells and each contains plurality of pixels. For each pixel in a cell, the pixel will compare its luminance value (Y) with the luminance value of its eight neighboring pixels. The central pixel and neighboring pixel are shown as a pixel block 501 in FIG. 5. In the example of FIG. 5, the pixel with the luminance value of 6 will compare its luminance value with neighboring pixel cells having luminance values of 6, 5, 2, 1, 7, 8, 9, and 7 respectively as described in the clockwise direction. Subsequently, the procedure of thresholding (e.g. S501) is performed based on the result of the comparison. If the luminance value of a neighboring pixel is less than the center pixel with the luminance value of 6, then "0" is recorded; otherwise if the luminance value of a neighboring pixel is greater than or the same as the center pixel with the luminance value of 6, then "1" is recorded.

For example, since the pixel in the upper left corner has the luminance value of 6 which is the same as the luminance value of the center pixel, a "1" is recorded in the upper left corner of the central pixel map 502 of FIG. 5. Similar, since the pixel in the upper middle direction of the central pixel has the luminance value of 5 which is less than the luminance value of 6, then "0" is recorded in the central pixel map 502 of FIG. 5. In this example provided, the thresholded values are 1, 0, 0, 0, 1, 1, 1, 1, and 1 respectively as described in the clockwise direction. Each of the thresholded values in the central pixel map 502 would then by multiplied by an assigned weight according to a weight table 503 (e.g. S503). The weights are 1, 2, 4, 8, 16, 32, 64, and 128 respectively. After each of the thresholded value multiplies by its corresponding weight, the LBP value is 1+16+32+64+128=241. Each pixel of a cell may contain a LBP value, and the LBP values collectively may form a LBP vector to be normalized. The LBP vector could be calculated according to:

$$LBP_{P,R} = \sum_{p=0}^{p-1} S(g_p - g_c)2^p,$$

where gp is luminance value of a neighboring pixel and gc is the luminance value of the central pixel.

Referring back to FIG. 4, after the performance of the texture feature extraction, step S403a would be executed to derive a positive local texture result and step S403b would be executed to derive a negative local texture result. The positive result and the negative result could be obtained by applying a threshold For FIG. 5 as an example, the negative result could be characterized according to:

$$S(x) = \begin{cases} 1, x \geq 0 \\ 0, x < 0 \end{cases},$$

where x is $g_p$ subtracted by $g_c$.

In this example, the negative result is the sum of the thresholded pixel multiplied by the weight which is 241 as previously calculated. It should be noted that the threshold value in this example is zero. However, the threshold value could be adjusted according to various design considerations.

To derive the positive results, a criteria that is opposite to the negative result or a threshold that is opposite to the negative result would be used. For the example, the positive result could be derived according to:

$$S(x) = \begin{cases} 1, x <= 0 \\ 0, x > 0 \end{cases},$$

where x is $g_p$ subtracted by $g_c$.

The thresholded value for the positive result would be the opposite of the negative result and would be 1, 1, 1, 0, 0, 0, 0, 0 as described in the clockwise direction. The multiplying the thresholded value by the weight table 503, the negative result would be 1+2+4+8=15.

According to another exemplary embodiment, the positive result could be derived according to:

$$S(x) = \begin{cases} 1, & x \leq \text{threshold } 1 \\ 0, & x > \text{threshold } 1 \end{cases},$$

where threshold1 is the threshold which could be zero or a value suitable for a specific circumstance.

Figure 6:
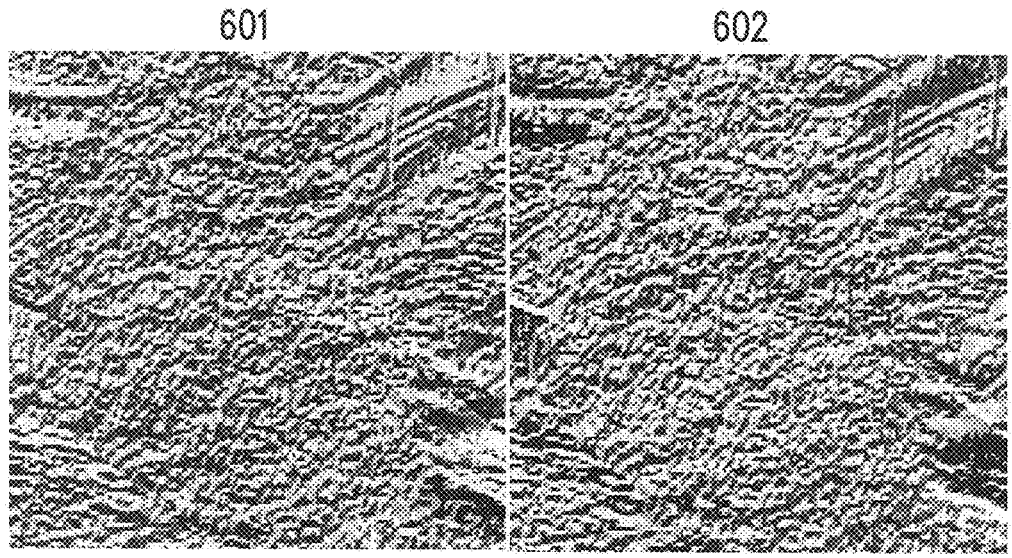
FIG. 6 illustrates examples of derived positive and negative results.

The negative result could be derived according to an opposite criteria of the positive result or a threshold value(s) that is opposite to the threshold value(s) used to derived the positive result. For this example, the negative result could be derived according to:

$$S(x) = \begin{cases} 1, & x \leq \text{threshold } 1 \\ 0, & x > \text{threshold } 1 \end{cases},$$

where threshold2 is the threshold which could be zero or a value suitable for a specific circumstance. An example of the output of the positive result of step S403*a* and the output of the negative result of step S403*b* is provided in FIGS. 6, 601 and 602 respectively. The example of FIG. 6 uses the same image of a house and a lawn as the image of FIG. 1.

In step S404*a*, mapping and local maximum extension is applied to the positive result so as to adjust the result of the texture feature extraction to be suitable for the construction of a single scale detail. Similarly, in step S404*b*, mapping and local maximum extension is applied to the negative result so as to adjust the result of the texture feature extraction to be suitable for the construction of a single scale detail. The mapping operation is performed for the positive result so that the result is rotation invariant and illumination invariant. Rotation invariant means that similar structures of texture would have the same calculation result after the rotations are applied to the textures. Illumination invariant means that similar structure of textures after calculation would not be related to the contrast of an image. The result of mapping would ensure that the synthesized details are properly aligned. Moreover, after the step texture feature extraction S402 is performed, similar value would mean that the textural structure is similar. Therefore, after mapping is performed, similar textural structure would correspond to the same detail value. For the process of mapping, a lookup table stored in the storage medium (e.g. 302) would be used in order to minimize the amount of calculations.

For the process of local maximum extension, the largest value, as the result of the positive mapping result, would undergo a positive extension. For the process of local minimum extension, the smallest value, as the result of the negative mapping result, would undergo a negative extension. This means that after the process of mapping, the largest value would be made larger, and the smallest value would be made smaller. In further detail, the processing unit (e.g. 301) may first determine whether a positive mapping result of a pixel is the largest value. If the positive mapping result of the pixel is the largest value, then the following equation is applied:

Pval 2=Pval 1×(1+gain1), wherein gain1 is a number between 0 and 1, Pval_1 is a positive mapping result of a pixel having the largest value, and Pval_2 is the adjusted value after the local maximum extension (i.e. adjusted positive mapping result).

Figure 7:
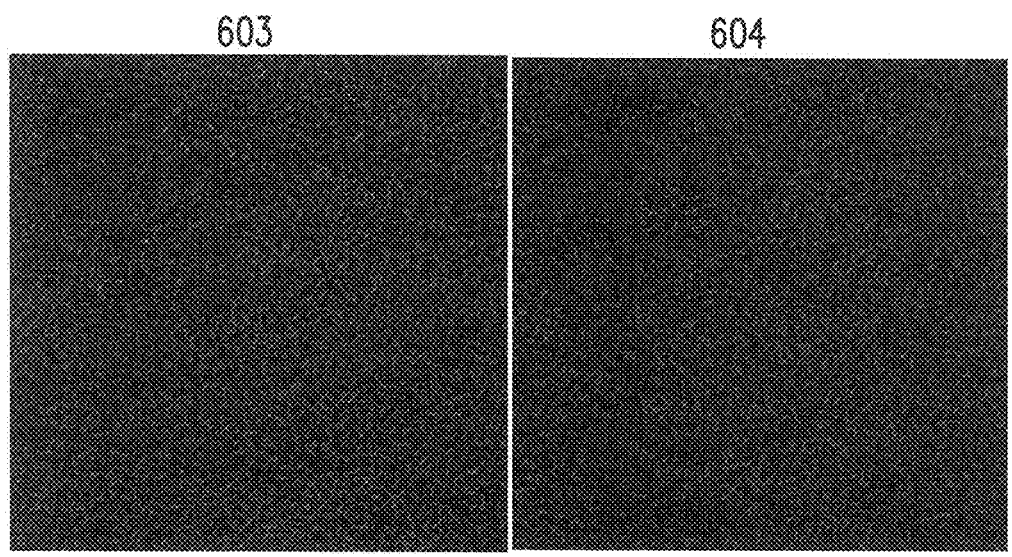
FIG. 7 illustrates examples of derived results by applying mapping and local maximum/minimum extensions.

Similarly, the processing unit (e.g. 301) may also determine whether a negative mapping result of a pixel is the smallest value. If the negative mapping result of the pixel is the smallest value, then the following equation is applied:

Pval 4=Pval 3×(1−gain2), wherein gain2 is a number between 0 and 1, Pval_3 is a positive mapping result of a pixel having the largest value, and Pval_4 is the adjusted value after the local maximum extension (i.e. adjusted negative mapping result). An example of an image after steps of S404*a* and step S404*b* by using the same image as FIG. 1 is shown in FIGS. 7, 603 and 604 respectively.

In step S405, the process of blending the adjusted positive mapping result and the adjusted negative mapping result is performed. The blending may simply be a linear addition between the adjusted positive mapping result and the adjusted negative mapping result. After the blending has been performed, in step S406, a single-scale detail is generated by giving positive detail values and the negative detail values different multiplicative gains so that similar black dots may have a different visual impact upon one's vision from similar white dots.

Figure 8:
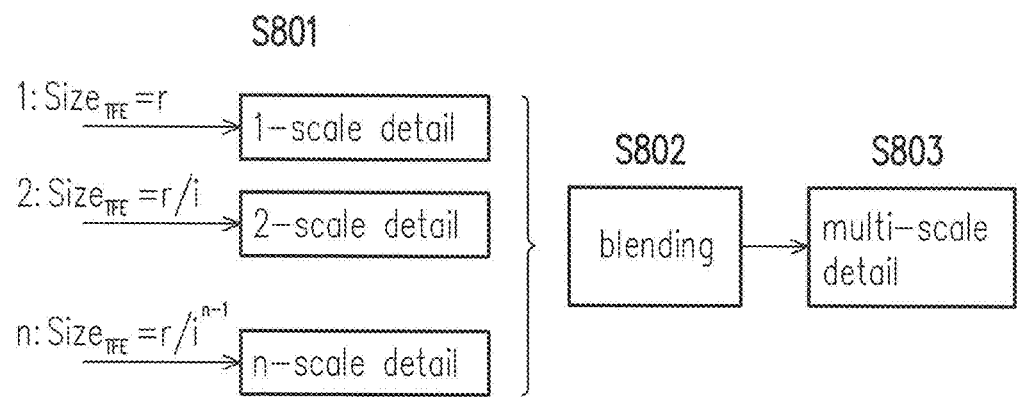
FIG. 8 illustrates multi-scale detail synthesis in accordance with one of the exemplary embodiments of the disclosure.
Figure 9:
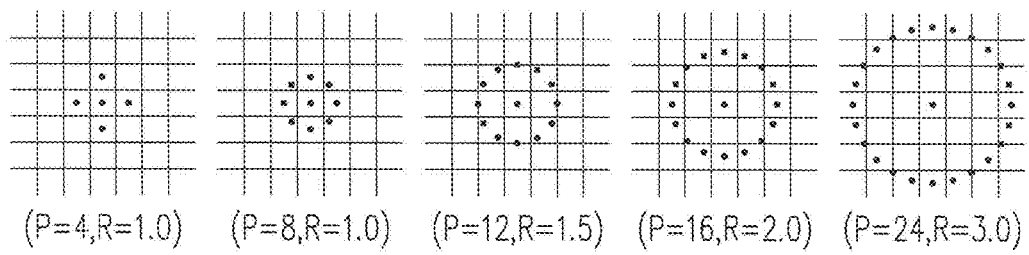
FIG. 9 illustrates applying multiple single scale detail synthesis by increasing block radius.

FIG. 8 illustrates multi-scale detail synthesis in accordance with one of the exemplary embodiments of the disclosure. In step S801, a plurality of single scale texture is synthesized by a single scale detail synthesis module (e.g. 310). For a textural feature, a plurality of single scale details of different scales are synthesized. The choice of different scales may follow the octave concept of factual geometry by adjusting the block size of each of the single scale details used to extract the local texture feature. The variable "r" of FIG. 8 stands for the block radius of a pixel block used to perform texture feature extraction. The variable "n" is an integer. Larger n means that a higher scale detail is used since in such case the block size used for texture feature extraction would be larger. The relationship between block size used for texture feature extraction and the variable "r" and "P" is shown in FIG. 9, where "P" standards for the number of peripheral pixels per pixel block. The larger the number of single scale synthesis (n) used, the larger the frequency distribution would be for the synthesized multi-scale detail, and similarly smaller "n" would result a smaller frequency distribution. Therefore, larger "n" is not necessarily better but could be optimized based on trial and error.

Figure 10:
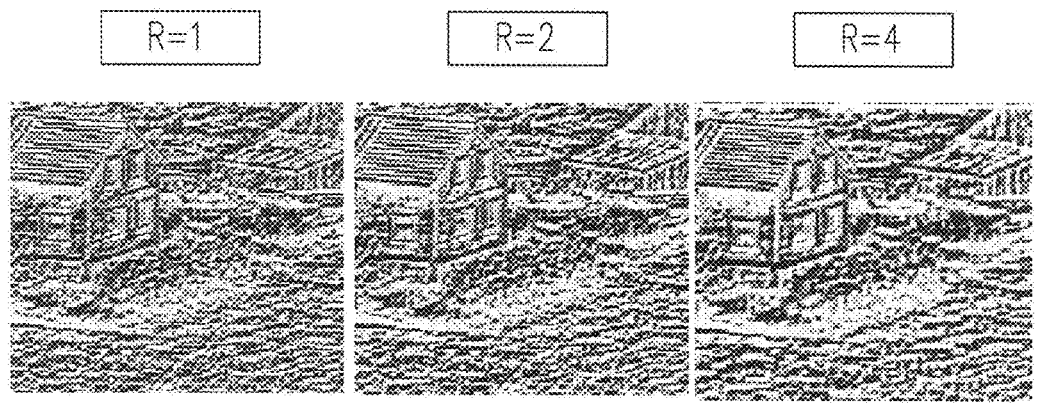
FIG. 10 illustrates examples of applying multiple single scale detail synthesis by increasing block radius.
Figure 10:
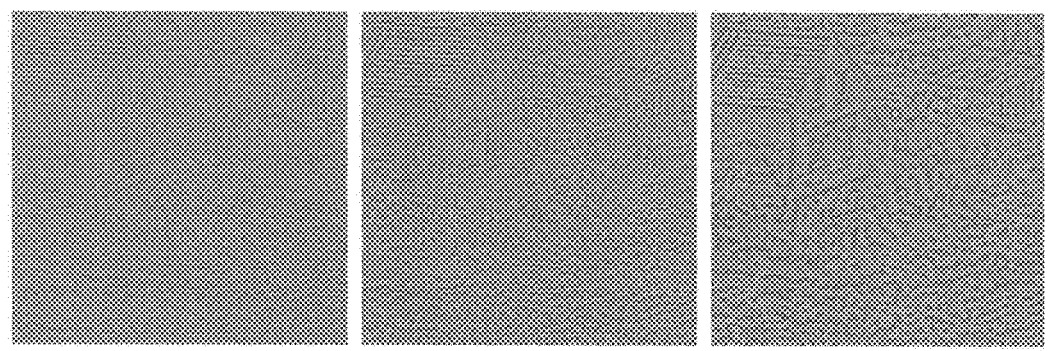
Figure 10:
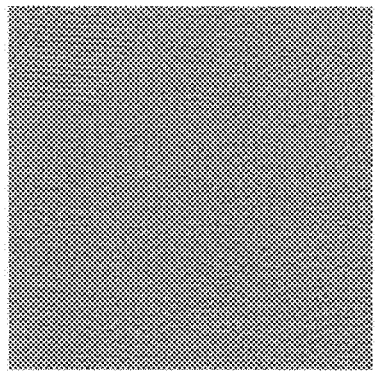

In step S802, the plurality of single scale texture is transmitted to a multi-scale detail synthesis module (e.g. 320) which blends the plurality of single scale textures. In step S803, a multi-scale texture is synthesized after blending is finished. An example of generating multiple single scale detail synthesis by increasing block radius is provided in FIG. 10. According to FIG. 10, the positive result of three single scale details of block radius 1, 2, and 4 are respectively shown in the first row. The three images in the second row of FIG. 10 shows the single scale detail corresponding to the three single scale details of block radius 1, 2, and 4, and the last row shows the multi scale detail of a multi-scale texture by blending the three single scale details of block radius 1, 2, and 4.

The purpose of performing the multi-scale synthesis by blending a plurality of single scale details is to ensure that the synthesized image is consistent with the original image. For example, details should not be synthesized in places of the original image where details should not exist. From the frequency perspective, there should not be a large gap between the frequency of the synthesized texture (middle to high frequency) and the frequency of the original image (low to middle frequency).

Figure 11:
FIG. 11 illustrates an example applying the proposed method of texture synthesis by using an imaging processing apparatus.
Figure 11:
Figure 11:

FIG. 11 illustrates an example of the overall image transformation by applying the proposed method of texture synthesis by using an imaging processing apparatus. The first image 1101 is the Y in or luminance value of the image of FIG. 1, which is an unprocessed raw image. The first image 1101 corresponds to the step of S401. The second image 1102 is a processed image by incorporating synthesized single scale textures. The third image 1103 is a processed image by incorporating synthesized multi-scale textures. It can be seen from the third image 1103 that it is sharper and contains more details even the image has been scaled up.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method of texture synthesis, the method comprising:
   generating, by using a processor, a first single scale detail image of a plurality of single scale detail images;
   and generating a multi-scale detail image by blending the plurality of single scale detail images, wherein generating the first single scale detail image comprising:
   performing a feature extraction of a first pixel block of an image frame to derive a first pixel feature;
   applying a first criteria to the first pixel feature to derive a positive result; performing a first detail alignment and a maximum extension of the positive result to derive an adjusted positive mapping result;
   applying a second criteria, which is opposite to the first criteria, to the first pixel feature to derive a negative result;
   performing a second detail alignment and a minimum extension of the negative result to derive an adjusted negative mapping result; and
   blending the adjusted positive mapping result and the adjusted negative mapping result to generate the first single scale detail image,
   wherein performing the first detail alignment and the maximum extension of the positive result to derive the adjusted positive mapping result comprising:
   performing the first detail alignment on the positive result by applying a mapping table to the positive result to derive a positive mapping result: and
   performing the maximum extension on the positive mapping result by at least increasing a highest number of the positive mapping result to derive the adjusted positive mapping result.

2. The method of claim 1, wherein applying the first criteria to the first pixel feature to derive the positive result comprising:
   applying a threshold to a pixel of the first pixel feature; and
   deriving the positive result as to comprise the first pixel block if the first pixel feature exceeds the threshold.

3. The method of claim 2 further comprising:
   multiplying each pixel of the first pixel feature that exceeds or is equal to the threshold by a corresponding weight; and
   deriving the positive result by summing weighted values of all pixels of the first pixel feature that exceeds the threshold.

4. The method of claim 2, wherein applying the second criteria, which is opposite to the first criteria, to the first pixel feature to derive the negative result comprising:
   applying the threshold to the pixel of the first pixel feature; and
   deriving the negative result as to comprise the first pixel block if the first pixel feature falls below or is equal to the threshold.

5. The method of claim 1, wherein performing the second detail alignment and the minimum extension of the negative result to derive the adjusted negative mapping result comprising:
   performing the second detail alignment on the negative result by applying the mapping table to the negative result to derive a negative mapping result; and
   performing the minimum extension on the negative mapping result by at least decreasing a lowest number of the negative mapping result to derive the adjusted negative mapping result.

6. The method of claim 1, wherein performing the maximum extension on the positive mapping result by at least increasing the highest number of the positive mapping result to derive the adjusted positive mapping result comprising:
   multiplying the highest number of the positive mapping result by (1+gain1), where gain1 is a number selected between 0 and 1.

7. The method of claim 5, wherein performing the minimum extension on the negative mapping result by at least decreasing the lowest number of the negative mapping result to derive the adjusted negative mapping result:
   multiplying the lowest number of the negative mapping result by (1−gain2), where gain2 is a number selected between 0 and 1.

8. The method of claim 1, wherein generating the multi-scale detail image by blending the plurality of single scale detail images comprising:
   performing a second single scale texture synthesis of a second pixel block of the image frame to generate a second single scale detail image of the plurality of single scale detail images, wherein the second pixel block is larger than the first pixel block; and
   blending at least the first single scale detail image and the second single scale detail image to generate the multi-scale detail image.

9. The method of claim 8, wherein the plurality of single scale detail images comprises a plurality of pixel blocks, wherein each pixel block of the plurality of pixel blocks comprises a different block radius and a different quantity of pixels.

10. An image processing apparatus comprising:
a storage medium; and
a processor coupled to the storage medium, wherein the processor is configured at least for:
generating a first single scale detail image of a plurality of single scale detail images; and
generating a multi-scale detail image by blending the plurality of single scale detail images, wherein the processor is configured for generating the first single scale detail image comprising:
performing a feature extraction of a first pixel block of an image frame to derive a first pixel feature;
applying a first criteria to the first pixel feature to derive a positive result;
performing a first detail alignment and a maximum extension of the positive result to derive an adjusted positive mapping result;
applying a second criteria, which is opposite to the first criteria, to the first pixel feature to derive a negative result;
performing a second detail alignment and a minimum extension of the negative result to derive an adjusted negative mapping result; and
blending the adjusted positive mapping result and the adjusted negative mapping result to generate the first single scale detail image,
wherein the processor is configured for performing the first detail alignment and the maximum extension of the positive result to derive the adjusted positive mapping result comprising:
performing the first detail alignment on the positive result by applying a mapping table stored in the storage medium to the positive result to derive a positive mapping result; and
performing the maximum extension on the positive mapping result by at least increasing a highest number of the positive mapping result to derive the adjusted positive mapping result.

11. The image processing apparatus of claim 10, wherein the processor is configured for applying the first criteria to the first pixel feature to derive the positive result comprising:
applying a threshold to a pixel of the first pixel feature; and
deriving the positive result as to comprise the first pixel block if the first pixel feature exceeds the threshold.

12. The image processing apparatus of claim 11, wherein the processor is further configured for:
multiplying each pixel of the first pixel feature that exceeds or is equal to the threshold by a corresponding weight; and
deriving the positive result by summing weighted values of all pixels of the first pixel feature that exceeds the threshold.

13. The image processing apparatus of claim 11, wherein the processor is configured for applying the second criteria, which is opposite to the first criteria, to the first pixel feature to derive the negative result comprising:
applying the threshold to the pixel of the first pixel feature; and
deriving the negative result as to comprise the first pixel block if the first pixel feature falls below or is equal to the threshold.

14. The image processing apparatus of claim 10, wherein the processor is configured for performing the second detail alignment and the minimum extension of the negative result to derive the adjusted negative mapping result comprising:
performing the second detail alignment on the negative result by applying the mapping table stored in the storage medium to the negative result to derive a negative mapping result; and
performing the minimum extension on the negative mapping result by at least decreasing a lowest number of the negative mapping result to derive the adjusted negative mapping result.

15. The image processing apparatus of claim 10, wherein the processor is configured for performing the maximum extension on the positive mapping result by at least increasing the highest number of the positive mapping result to derive the adjusted positive mapping result comprising:
multiplying the highest number of the positive mapping result by (1+gain1), where gain1 is a number selected between 0 and 1.

16. The image processing apparatus of claim 14, wherein the processor is configured for performing the minimum extension on the negative mapping result by at least decreasing the lowest number of the negative mapping result to derive the adjusted negative mapping result:
multiplying the lowest number of the negative mapping result by (1−gain2), where gain2 is a number selected between 0 and 1.

17. The image processing apparatus of claim 10, wherein the processor is configured for generating the multi-scale detail image by blending the plurality of single scale detail images comprising:
performing a second single scale texture synthesis of a second pixel block of the image frame to generate a second single scale detail image of the plurality of single scale detail images, wherein the second pixel block is larger than the first pixel block; and
blending at least the first single scale detail image and the second single scale detail image to generate the multi-scale detail image.

18. The image processing apparatus of claim 17, wherein the plurality of single scale detail images comprise a plurality of pixel blocks, wherein each pixel block of the plurality of pixel blocks comprises a different block radius and a different quantity of pixels.

* * * * *